(12) United States Patent
Huang et al.

(10) Patent No.: US 7,647,046 B2
(45) Date of Patent: Jan. 12, 2010

(54) MAINTAINING UNINTERRUPTED SERVICE IN A WIRELESS ACCESS POINT AND CLIENT STATIONS THEREOF

(75) Inventors: Wenfeng Huang, San Ramon, CA (US); Huizhao Wang, San Jose, CA (US); Xiaode Xu, Fremont, CA (US); Arnold M. Bilstad, Redwood, CA (US)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 11/034,912

(22) Filed: Jan. 12, 2005

(65) Prior Publication Data

US 2006/0153151 A1 Jul. 13, 2006

(51) Int. Cl.
*H04W 4/00* (2009.01)
(52) U.S. Cl. ............... 455/432.1; 455/436; 455/446
(58) Field of Classification Search .............. 455/432.1, 455/452.3, 453; 370/338
See application file for complete search history.

(56) References Cited

U.S. PATENT DOCUMENTS

| 5,475,870 | A | * | 12/1995 | Weaver et al. | ............ 455/67.11 |
| 6,097,953 | A | * | 8/2000 | Bonta et al. | ............ 455/436 |
| 6,144,855 | A | | 11/2000 | Slovin | ............ 455/432 |
| 6,674,738 | B1 | * | 1/2004 | Yildiz et al. | ............ 370/338 |
| 7,054,632 | B2 | * | 5/2006 | Attar et al. | ............ 455/436 |
| 7,257,095 | B2 | * | 8/2007 | Liu | ............ 370/311 |
| 2003/0179708 | A1 | * | 9/2003 | Kamerman et al. | ......... 370/241 |
| 2004/0190477 | A1 | | 9/2004 | Olson et al. | ............ 370/338 |
| 2004/0233867 | A1 | | 11/2004 | Wheatley, III et al. | ...... 370/328 |
| 2005/0176420 | A1 | * | 8/2005 | Graves et al. | ............... 455/424 |

OTHER PUBLICATIONS

D. Wong and T. J. Lim. "Soft Handoffs in CDMA Mobile Systems." *IEEE Personal Communications*, vol. 4, No. 6, pp. 6-17, Dec. 1997.
N. D. Tripathi, J.H. Reed and H.F. VanLandingham. "Handoff in Cellular Systems." *IEEE Personal Communications*, vol. 5, No. 6, pp. 26-37, Dec. 1998.
S.H. Hwang, S.L. Kim, H.S. Oh, C.E. Kang and J.Y. Son. "Soft Handoff Algorithm with Variable Thresholds in CDMA Cellular Systems." Electronics Letters, vol. 33, No. 19, pp. 1602-1603, Sep. 1997.

* cited by examiner

*Primary Examiner*—Patrick N. Edouard
*Assistant Examiner*—Chuck Huynh
(74) *Attorney, Agent, or Firm*—Dov Rosenfeld; INVENTEK

(57) ABSTRACT

A method, an apparatus, and code in a carrier medium to operate in a first access point of a wireless network in communication with at least one associated client station. The method includes wirelessly broadcasting a management frame including an indication that the first access point will stop being active, such that each associated client station can wirelessly roam to a second access point prior to the first access point ceasing being active. One embodiment further includes reducing the transmit power of wireless communication used to wirelessly transmit information to the associated client stations, such that each associated client station can eventually wirelessly roam to the second access point.

28 Claims, 5 Drawing Sheets

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM | The TIM information element is only present within Beacon frames generated by APs. |
| 11 | Shut down Indication | In msec, 0xFFFF means normal operation |

403 — 405

| Octets | 2 | 2 | 6 | 6 | 6 | 2 | 0-2312 | 4 |
|---|---|---|---|---|---|---|---|---|
| Field | Frame Control | Duration | DA | SA | BSSID | Sequence Control | Frame body | FCS |

FIG. 4A

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM | The TIM information element is only present within Beacon frames generated by APs. |
| 11 | Shut down Indication | In msec, 0xFFFF means normal operation |

FIG. 4B

MAINTAINING UNINTERRUPTED SERVICE IN A WIRELESS ACCESS POINT AND CLIENT STATIONS THEREOF

BACKGROUND

The present invention is related to wireless networks, and in particular to wireless local area networks (WLANs).

Wireless networks, e.g., local area wireless networks conforming to the IEEE 802.11 standard have become common. WLANs often are used in infrastructure mode with one wireless station, called an access point (AP), acting as a base station for a set of client wireless stations. A client station associates with an AP, and following such association, all wireless communication between the client station and any other entity is via the AP. In such a WLAN, there may be times when it is necessary or desired to take an AP of a WLAN offline while the AP is operating, e.g., while there are one or more operational client stations that are currently associated with the access point. Furthermore, there may be a need to take the access point offline in an manner that does not interrupt communication between a client of the AP and another part of the network to which the AP is connected. For example, some of the operating client stations of the AP may be using the communication for live voice communication using, e.g., voice over IP (VoIP), and in such a case it would be detrimental to interrupt a live voice communication.

A forced handoff from one base station of a cellular wireless system to another is well known in the art. For example, it is known how to take a base station of a cellular telephone system offline in a cellular system. In a CDMA cellular system, it is also known how to carry out what is called a "soft handoff" that provides for handing off a particular handset in communication from one base station to another in a manner that does not interrupt communication. See for example, Wong, D.; Teng Joon Lim: "Soft handoffs in CDMA mobile systems," IEEE Personal Communications, Vol. 4, No. 6, Pages: 6-17, December 1997. See also Tripathi, N. D.; Reed, J. H.; VanLandinoham, H. F.: "Handoff in cellular systems, IEEE Personal Communications, Vol. 5, No. 6, Pages: 26-37, December 1998, and Seen-Ho Hwang; Seong-Lyun Kim; Hyun-Seo Oh; Chang-Eon Kang; Jung-Young Son: "Soft handoff algorithm with variable thresholds in CDMA cellular systems," Electronics Letters, Vol. 33, No. 19, 11, Pages: 1602-1603, September 1997.

As WLANs originally designed for data communication are oriented more and more to real time applications, such as wireless VoIP and other wireless media services, there are higher requirements being made on wireless network service availability and reliability. For example, there is an expectation of non-interrupted voice service to a similar level to that achieved with a wired phone call. In a widely deployed wireless network environment, there may be a need to pull a wireless AP out of service, temporarily or permanently. Reasons for such action may be a service quality problem, need for a system upgrade, or for administrative purposes. With present technology, the clients attached to the AP may lose ongoing services, especially in the case of real time applications. Thus, with VoIP, a call may be dropped, or service quality may otherwise be degraded.

Thus there is a need in the art for taking an AP offline without dropping service, including communication with one or more client wireless stations. There furthermore is a need to prevent new clients from associating with the AP.

In cellular telephony, each cell has a base station, and the mobile stations communicate via the base station of the cell. When a cell needs to go down, methods are known and used in cellular telephony that force a mobile station to handover to another base station if the mobile station is in an active call state with the base station that's about to be taken offline. This is carried out typically by the base station instructing the mobile station to hand over to a specific cell, e.g., a specific base station. A base station being taken off line instructs its mobile stations to so hand over, one mobile station at a time.

SUMMARY

Described herein are method, apparatus, and code-carrying carrier medium embodiments to operate in a first access point of a wireless network in communication with at least one associated client station. Also described herein are method, apparatus, and code-carrying carrier medium embodiments to operate in a client station in association with a first access point of a wireless network. One aspect of the method operating in a first access point includes wirelessly broadcasting a management frame including an indication that the first access point will stop being active, such that each associated client station can wirelessly roam to a second access point prior to the first access point ceasing being active. Another aspect of the method operating in a first access point includes reducing the transmit power of wireless communication used to wirelessly transmit information to the associated client stations, such that each associated client station can eventually wirelessly roam to the second access point.

Other aspects and features will be clear form the description and attached claims.

BRIEF DESCRIPTION OF THE DRAWINGS

FIGS. 4A and 4B shows a new frame structure-in this embodiment, a modification of a beacon frame, to support aspects of the invention described herein.

DETAILED DESCRIPTION

Described herein are a method, an apparatus, and a carrier medium containing code to cause a machine to implement a method for maintaining uninterrupted service in a wireless access point and client stations thereof.

Figure 1:
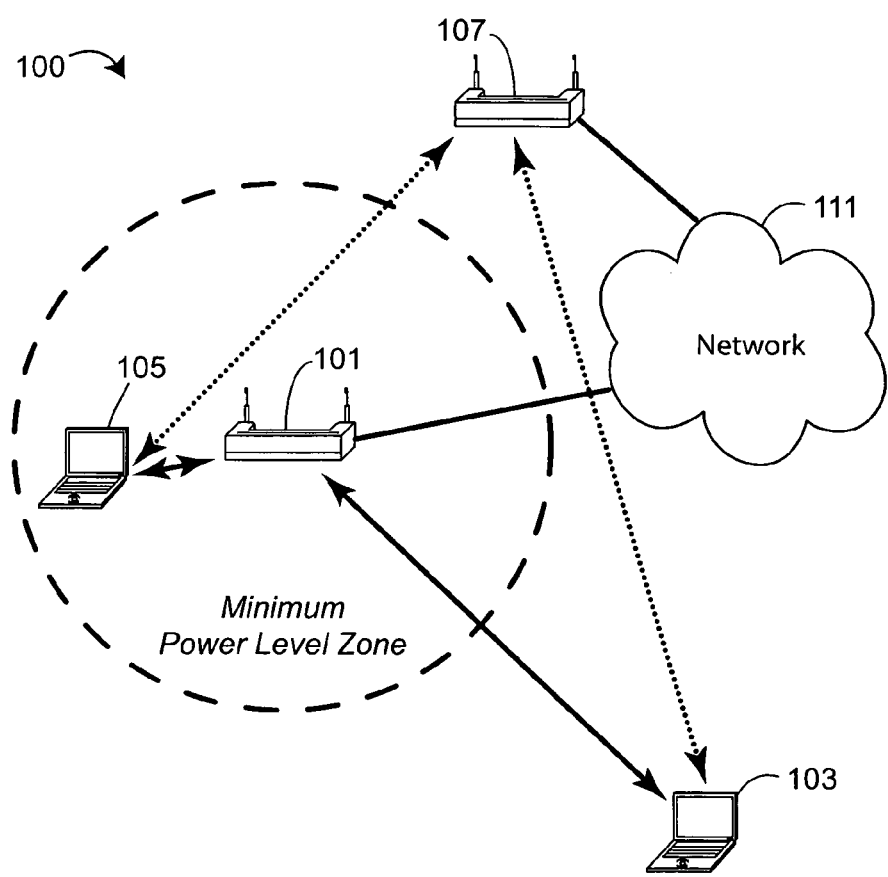
FIG. 1 shows a simplified diagram of a wireless network containing a first access point, one or more associated client stations, and a second access point.

FIG. 1 shows a simplified block diagram of a wireless network 100 containing a first access point 101 coupled to—and thus part of—a network 111, e.g., a wired network, one or more client stations associated with the first access point 101, and a second access point 107 also coupled to—and thus part of—the network 111. The coupling of the first and/or second access point to the network 111 can be a wired or wireless connection.

Consider one of the client stations of wireless network 100, say client station 105 that is associated with the first access point 101. Suppose the client station 105 is in communication with a node 103 of the network 111 via the first access point 101. In the example shown, the node 103 is another client station of the access point 101 and therefore in the wireless network 100, but in another example, the node may be any wired or wireless node of the network 111. One aspect of the invention is a method in the first access point 101 to cause any client station that is associated with the first access point 101 and in communication with a node in the network to which the first access point is connected to undergo a wireless roaming process and associate with another access point connected to a network to which the node is also connected, e.g., to the second access point 107 connected to the network 111. This provides for taking the first access point 101 off-line, e.g., for maintenance or upgrading purposes. By causing the roam, communication need not be interrupted between the client station 105 via the first, initially associated access point 101 and any node 103 in the network to which the first and second access points are coupled, e.g., the communication between the client station 105 and the node 103.

Figure 2:
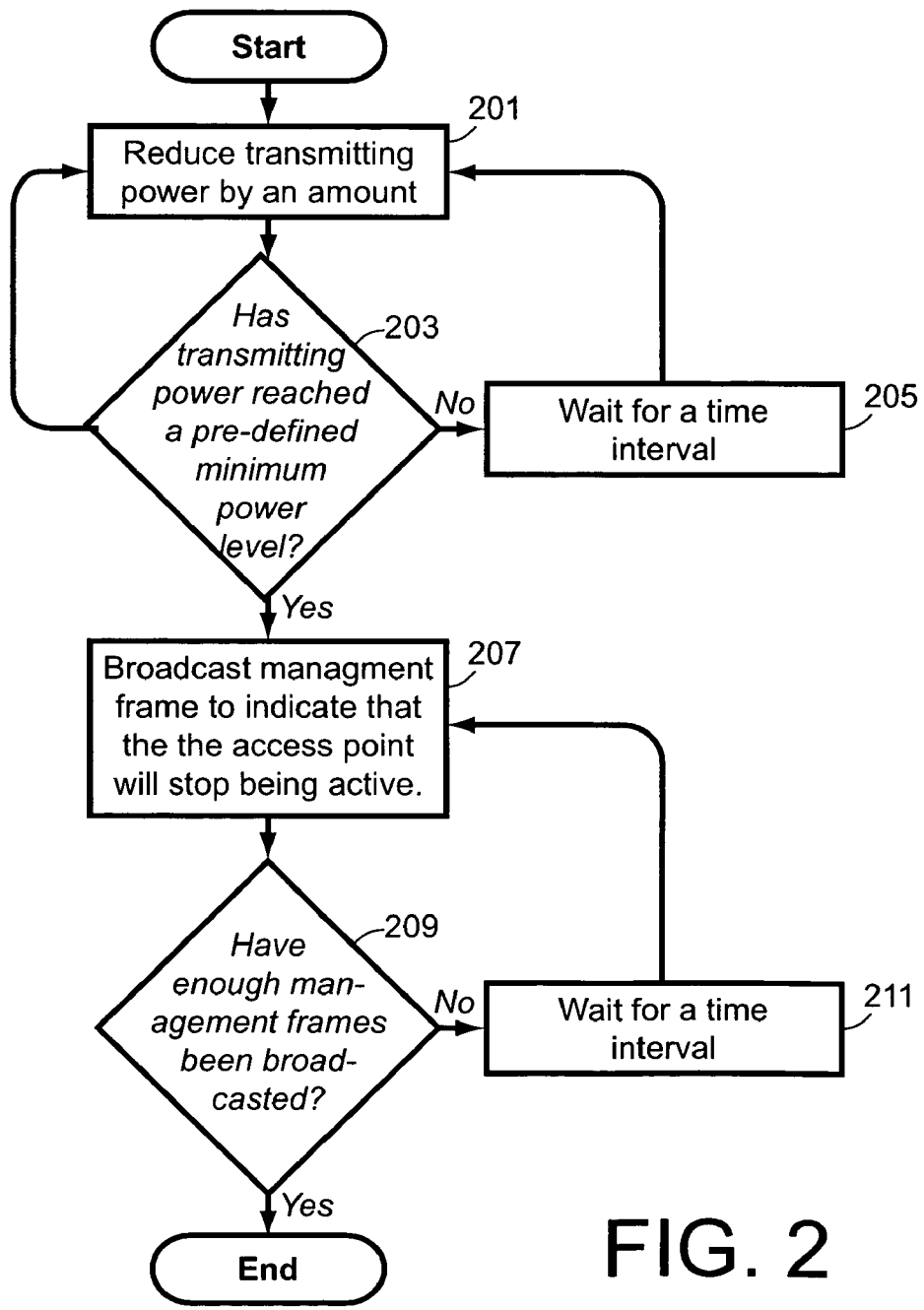
FIG. 2 shows a flowchart of one embodiment of a method in an access point of a wireless network for causing associated client stations to wirelessly roam to another access point.

FIG. 2 shows a flowchart of one embodiment of such a method.

The IEEE 802.11 standard for WLANS, and other wireless networking standards include protocols for such wireless roaming. In one example, if the quality of the received signal, as measured by the received signal strength such as the received signal strength indication (RSSI) in a wireless station becomes smaller than some preset threshold, then the wireless station initiates a wireless roaming procedure. For example, if the wireless station is a client station, how such a client station wirelessly roams from one access point to another access point is known and well established in the art.

In one embodiment of the invention, such roaming is induced under certain conditions. As shown in the flowchart of FIG. 2, in one embodiment, a first AP, e.g., AP 103 carries out a power reduction step 201 to induce wireless roaming in one or more client stations associated with the AP.

In the preferred embodiment, the power reduction is carried out in a plurality of steps rather than in one step so as to not cause any of the associated client stations to simply and suddenly lose signal. For example, the first access point, e.g., AP 101, in 203 ascertains whether or not a pre-defined minimum power level has been reached, and if not, then in 205 the AP waits for a pre-defined time interval, and repeats the power reduction step 201. In a particular embodiment, the power reduction is carried out in six or seven steps. For example, suppose the first access point 101 is transmitting at 100 mw. The first reduction (203) of communication power is to 75 mw, the second to 50 mw, the third to 30 mw, the fourth to 20 mw, the fifth to 10 mw, and then finally, the sixth instance of step 201 reduces the transmit power to 5 mw. The pre-defined minimum power level is thus 5 mW. In this example, each reduction step is separated in wait step 205 by a pre-defined interval of one second.

The inventor has found that the power reduction process, as shown for example in 201, 203 and 205 of the embodiment of FIG. 2, causes successful roaming of any associated client stations to a different access point, e.g., in the example of FIG. 1, to the second AP 107.

At the end of the reduction process, there are three possibilities for each associated, or previously associated, client station. The first possibility is that the client station has successfully roamed to a different (second) access point. The second possibility is that the client station is still associated with the first access point even when the first access point is transmitting at a minimum power level. For example, associated wireless station 105 in FIG. 1 could still be associated with the first access point 101 even after the first access point reduces its transmitting power to a pre-defined minimum power level. The third possibility is that there is a catastrophic power drop-off that causes the associated client station to be disconnected from the wireless network. In this description, the third possibility is considered to be extremely unlikely, and therefore not discussed further.

Another aspect of the invention is handling the case where one or more client stations are still associated with the first access point even when that AP is transmitting at the pre-defined minimum power level. For this situation, one aspect of the invention is to use a management frame to indicate to all associated client stations that the AP will stop being active at some future point in time, e.g., that the first access point is going offline at some point in the (near) future. In one embodiment, the management frame is a new management frame that is a broadcast frame broadcast by the AP as described later in the specification. In another embodiment, the management frame is a modification of a standard beacon frame.

Recall that the management frame broadcasts to all potential clients that may be in association, or that may desire association with the first AP, that the first AP will cease operation in the (near) future. In one embodiment, the first access point is set to become not active in a preset amount of time from the time of the broadcast. In a particular embodiment, this preset amount of time is a relatively small amount of time, e.g., 10 seconds.

Another aspect of the invention is that client stations understand such management frames. Yet another aspect of the invention is that client stations maintain a list of one or more available APs, e.g., as a result of the client station listening for and receiving beacon frames transmitted, e.g., broadcast, by access points. Such a client station that maintains a list of APs, as a result of receiving a management frame broadcast by the first access point that the first access point is about to go offline interprets such a received management frame as a request to remove the AP that transmitted the management frame from the client station's list of available APs. The client station removes the first AP, and now has a modified list of available APs with which to associate.

Continuing with the flowchart of FIG. 2, in step 207, the first AP broadcasts a management frame. In a simple embodiment, the management frame is transmitted only at the minimum power level used the last instance of 203, e.g., 50 mW in the example mentioned. In an improved embodiment, to ensure that all associated client stations can successfully roam to another access point, including those client stations that were in a "sleep mode" during the power reduction process, one or more management frames are also broadcast at a higher power than the pre-defined minimum power level. Such an embodiment that includes repetition of broadcasting of management frames is shown in FIG. 2. In 209, the first AP ascertains if enough management frames have been sent, and if the first AP determines not enough, in 211 the AP waits for a pre-defined time interval and then repeats step 207 of broadcasting the management frame. Thus, each step of broadcasting the management frame is separated by a preset time interval. For example, the preset time interval in one version is selected such that a client station that was asleep during the first broadcast would be awake after the pre-defined time interval.

The method described above provides for an easy handoff from one access point to another with a minimum amount of interruption.

Note that alternate embodiments of the invention start with the AP transmitting to the management frame announcing that the AP is about to be taken offline, e.g., with blocks 207, 209, and 211 of the flowchart of FIG. 2, and then continuing with the gradual transmit power reduction shown as 201, 203, and 205 in FIG. 2. Yet another embodiment of the invention includes the AP transmitting to the management frame announcing that the AP is about to be taken offline, e.g., blocks 207, 209, and 211 of the flowchart of FIG. 2, but does not necessarily include the gradual transmit power reduction shown as 201, 203, and 205 in FIG. 2. Yet another version includes the gradual transmit power reduction shown as 201, 203, and 205 in FIG. 2, but does not necessarily include the AP transmitting the management frame announcing that the AP is about to be taken offline, e.g., blocks 207, 209, and 211 of the flowchart of FIG. 2.

Figure 3:
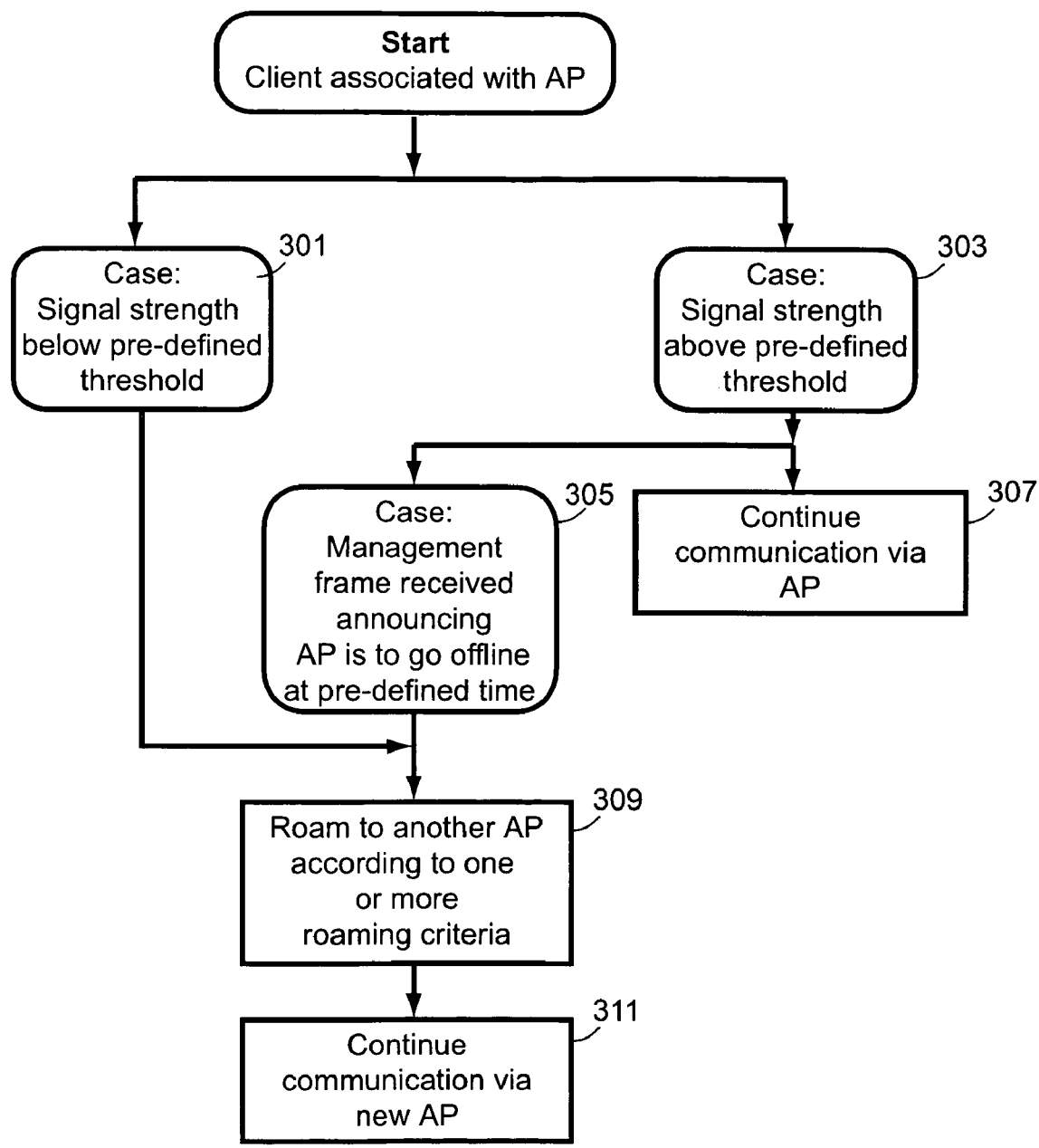
FIG. 3 shows a flowchart of one embodiment of a method in a client station associated with a first access point, showing an aspect of the invention that results from action by the first access point as described in the embodiment of FIG. 2, and that caused the client station to associate with (to roam to) a second access point.

While the above description was in terms of what happens at the first AP to cause an associated client station to associate with a different, e.g., a second AP, another aspect of the invention includes a method implemented in a client station of a wireless network that is associated with a first access point. FIG. 3 shows a flowchart of a method implemented in a client station, such as client station 105 that is in association with an AP, e.g., the first AP 101. Suppose that the first access point 101 reduces the power of transmission as described in the previous paragraphs and FIG. 2. At some stage, shown in 301, the client station receives signals from the first AP at a received power level below a pre-defined threshold, such that the client station, in 209, commences a wireless roaming procedure to associate itself with a different, say a second AP. In one embodiment, this second access point is selected from a set of access points stored at the client station based on beacon frames received from access points. While in one embodiment, the client station wirelessly roams to the second access point when the measured quality of received signal strength from the first access point becomes smaller than a preset threshold, in another embodiment, a measure of the received signal quality, e.g., a measure related to the error vector magnitude (EVM) of signals from the first AP is used as a criterion of when to initiate wireless roaming. In such an embodiment, the case 301 would be changed to the signal quality measure dropping below a pre-defined threshold. A signal quality measure related to the EVM of the received signal has been found to be a much more reliable measure of the quality of communication than signal strength, e.g., the RSSI measure. Selecting an AP to associate with, e.g., for the roaming of 309, based on a measure of signal quality other than signal strength, e.g., according to a measure of the EVM is described, e.g., in U.S. patent application Ser. No. 10/700,011 to inventors Goodall et al., filed Nov. 3, 2003, titled SELECTING AN ACCESS POINT ACCORDING TO A MEASURE OF RECEIVED SIGNAL QUALITY, Agent/Attorney No. CISCO-7823, assigned to the assignee of the present invention, and incorporated herein by reference.

Once the station has in 309 romaed to another AP, e.g., associated with the second AP 107, in 311, communication continues via the new AP.

Suppose, as shown in case 303 in FIG. 3, that the client station is still in communication with the first access point 101, as indicated by the signal strength (or measure of received signal quality) above the pre-defined threshold, even after such an access point has reduced its transmit power to a pre-defined minimum level, e.g., according to an aspect of the invention described in 201, 203, and 205 of the flowchart of the method embodiment shown in FIG. 2. In accordance to one aspect of this invention, the first AP would then transmit a management frame. In FIG. 3, 305 shows the case that the client station wirelessly receives a management frame that was broadcast by the AP. Such a management frame, as described above, includes information that announces that the first access point 101 will stop being active at a defined time. In one embodiment, the management frame includes a pre-defined amount of time from its broadcast time that indicates when the first access point will stop being active. In accordance to one aspect of the invention, in 309, the client station initiates the roaming procedure that associates the client station to a second access point from which it has received a beacon, e.g., that is in it's AP list and therefore with which it can communicate. The client station in 311 then continues communication, now via the new AP.

The case of no management frame received is shown as 307, assuming the AP does not go offline. It would be clear to those in the art that if 301 or 305 are not the cases that occur, and the AP instantly goes offline, communication will be (temporarily) lost until the client can re-associate with another AP.

FIGS. 4A and 4B shows a structure of a new management frame used to announce that an access point will stop being active at some preset amount of time. In one embodiment, the new management frame is a slight modification of a standard beacon frame. FIG. 4A shows a such a beacon frame 400 that would be standard were it not for the frame body field 403 in the beacon frame 400 which, in order to provide for aspects of the present invention, includes an additional two octets, in the 11th order at the end of the frame body field 403 to indicate the time that the AP will be remaining in operation. FIG. 4B shows in table form the information contained in the frame body 403 of a beacon management frame that includes the additional code to indicate that the AP is about to go offline. The two-octet code 0xFFFF (Hex) is used to indicate normal operation. Thus, a client station modified to include aspects of the present invention would understand that a two-octet code in order 11 code other than 0xFFFF means that the AP transmitting the beacon is about to go offline.

Note that a probe response also would have such a modification, such that a client seeking a probe response from an AP that's about to go offline would receive an indication that the AP is about to go offline.

Thus, a frame such as modified beacon 400 is broadcast by an AP to inform both associated clients, and clients that might otherwise roam to this access point, that this serving access point is under administrative shutting down state. Any client station receiving such a management frame would remove the AP from its AP list until new beacon frames are received from that AP announcing its availability. Furthermore, as described above, any client station associated with the sending AP would roam to another access point, e.g., from its AP list. Such a roam preferably occurs rapidly so that no communication is lost.

For direct applications in a managed WLAN, a management frame containing a management information element (IE) is sent to indicate the state of station. Administrative shutting down at this case, is be broadcasted to be received all client stations. A timer is used to indicate the elapsed time allowed for clients to finds their new access points, i.e., new parents. Typically, in the case of the IEEE 802.11 standard, the timer should not be shorter than the delivery traffic indicator message (DTIM) interval to allow clients in power save mode to have the chance to hear the message. This aspect of the invention requires a newly defined information element (IE) added to a modified version of what is now the IEEE 802.11 standard, or put into CCX program to achieve broad benefits.

Thus a method has been described that provides for maintaining quality of service of wireless connected clients when their serving access node is pulling out of service. The method includes one or both sending a management IE to indicate the current state of the AP, and a gradual multi-step reduction of transmit power to cause any associated client stations to roam and quickly associate with another AP.

Thus, all clients would try to roam to other access nodes, while maintaining service quality.

One embodiment of the invention operates in a managed wireless network in which the APs and their clients are managed by a central management entity. The managed wireless network substantially conforms to the IEEE 802.11 standard in that the network is compatible with that standard, and includes slight modifications, such as additional MAC frames that are used to convey information such as the state of an AP, e.g., that the AP is about to go offline at some defined time. Furthermore, stations of the network measure the received signal strength relatively accurately. Furthermore, some stations also have the capability of measuring the signal quality, e.g., by a measure related to the EVM. By a managed access point is meant an access point that can transmit such state information, e.g., as a broadcast. For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference. U.S. patent application Ser. No. 10/766,174, however, does not describe the new type of frame described herein.

One aspect of the invention includes defining a common frame structure to be used by transmitting APs and understood by client stations. In one embodiment, the APs are assumed to be managed APs in a managed WLAN as described in the above-described and incorporated by reference U.S. patent application Ser. No. 10/766,174. In this description, it is assumed that APs are "conforming" in that they transmit such a frame, and that at least some of their associated client stations understand the structure of such a frame.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements; and the physical constraints of the network (e.g. campus, building, and so forth).

In this description, we assume a single management entity we call the WLAN Manager. Management entities we called Subnet Context Managers may be included, each controlling some aspects of a single subnet or virtual local area network (VLAN). A Subnet Context Manager, for example, may relay instructions from the WLAN manager to all managed APs in its subset or VLAN. In some embodiments, the functions of the subnet context manager are carried out at a higher level, e.g., at the same level as the WLAN Manager. Other embodiments may have a different number of levels in the hierarchy with different levels of management. For example, in some embodiments, the functions of the subnet context manager are carried out at a higher level, e.g., at the same level as the WLAN Manager. For more information on radio management, see the above-mentioned incorporated herein by reference U.S. patent application Ser. No. 10/766,174.

The WLAN Manager manages several aspects of the wireless network, e.g., security, and in one embodiment, authorizes a set of access points in the network—we call these the managed access points—including maintaining a database called the Configuration Database that contains configuration parameters. The Configuration Database also includes an AP database that includes information on the managed APs, e.g., a list of the managed APs together with some data related to these APs, such as the location of the APs and the power the APs are set to transmit at. A single WLAN Manager is typically deployed to handle all the wireless clients within the enterprise campus. The WLAN Manager provides centralized control of various aspects of the radio environment within a given set of APs, including the measurement aspects of the present invention and the radiolocation aspects of the present invention. The WLAN Manager provides the ability to determine network wide radio parameters during initial network deployment and network expansion. In one embodiment, the WLAN Manager selects certain radio parameter values to provide an adequate radio environment. In one embodiment, the WLAN Manager further centrally coordinates all client and AP measurements.

A wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

One embodiment of the invention operates in a managed wireless network in which the APs and their clients are managed by a central management entity. One embodiment of the managed wireless network substantially conforms to the IEEE 802.11 standard. By substantially conforming we mean compatible with. Some aspects of the IEEE 802.11 standard are modified slightly to accommodate some management aspects used in the invention. In particular, for some aspects of the invention, an additional MAC frame broadcast to announce the AP state is assumed. Such a MAC frame may be a modified beacon, that includes additional information units, i.e., data fields, containing the additional information.

Furthermore, aspects of the invention are intended for operation under a set of specifications that specify some extensions to the EEE 802.11 specifications that deal with the ability of APs to transmit such additional information, and for client stations to understand the additional information, e.g., information on the state of an AP. One set of extensions to the IEEE 802.11 specifications is known as the Cisco Compatible Extensions For WLAN Devices ("CCX"), by Cisco Systems, Inc., of San Jose, Calif. Under preset-day CCX, a client has to be able to transmit with a transmit power accuracy of ±3 dB. By a "compliant client" is meant a client that conforms to extensions of the IEEE standard in several ways, including, for the purpose of the present invention, by its ability to understand information sent by an AP that the AP is to be taken out of service at a particular time.

Figure 5:
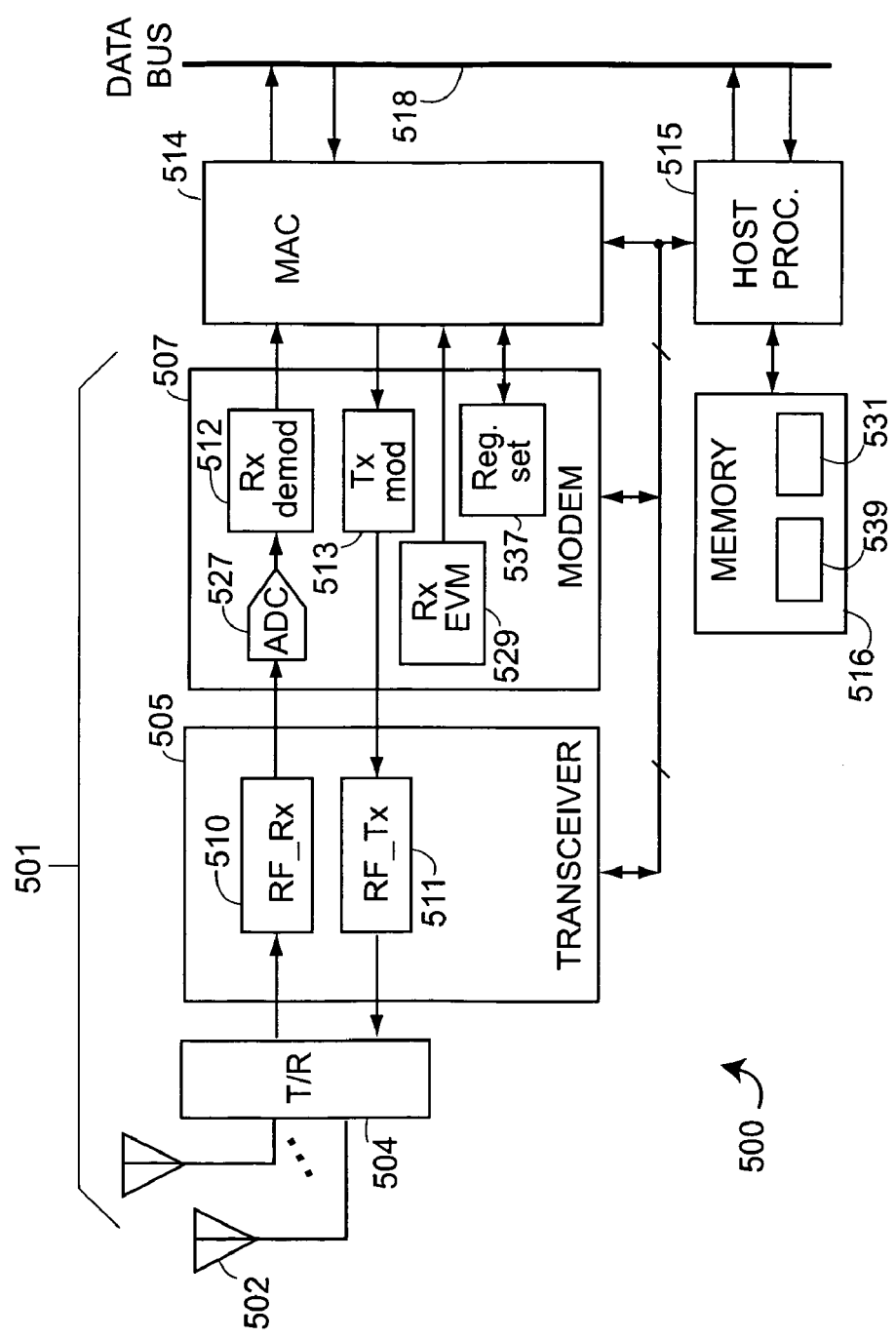
FIG. 5 shows a simple block diagram of one embodiment of a wireless station that can operate as an access point, or as a client station, and that incorporates aspects of the present invention.

FIG. 5 is a functional block diagram of a wireless station 500 that includes an embodiment of present invention. The station 500 may, for example, implement an AP that implements the method embodiment of FIG. 2, or may implement a client station that is caused to roam, e.g., as described in the flowchart of FIG. 3. The station 500 includes a physical layer interface (PHY) 501 that includes at least one antenna 502 for the frequency or frequencies of service (approx. 2.4 GHz and/or approx. 5 GHz), a transmit/receive (T/R) switch 504 for half-duplex operation, a transceiver 505 that includes a radio frequency (RF) wireless receiver 510, and an RF wireless transmitter 511. The PHY also includes a modem 507 that includes a demodulator 512 and a modulator 513. The receive path to the demodulator includes an analog-to-digital converter (ADC) 527 to produce samples of the received signal. The system 500 further includes a medium access controller (MAC processor, or simply MAC) 514 for layer-2 processing. A computer system databus 518 is included in one embodiment, as is a host processor 515.

In one embodiment, a memory 516 is included for data buffering and program storage. The memory 516 may be directly coupled to the host or to the MAC or to both.

Alternate embodiments do not include the host processor. The host processor function may, for example, be incorporated with the MAC 514.

In addition to the payload data between the modem 507, radio transceiver 505, and MAC 514, control information such as gain settings for the radio receiver from an automatic gain control module in the modem 507, and other data is communicated between the transceiver and the modem. Furthermore, other data may be communicated between the modem and the MAC, and between the modem and the host (if included).

A set of registers 537 is included. In one embodiment, the MAC processor 514 has access to at least some of the set of registers 537. Some registers can be loaded with data from the MAC 514, others provide data for the MAC processors, while some may provide for two-way communication.

In one embodiment, the modem 507 includes a signal quality calculator 529 that determines a measure of the received signal quality from samples of the received signal. One embodiment of the signal quality calculator 529 is an EVM calculator that determines a measure of the EVM for a received packet or part thereof, and communicates the EVM measure to the MAC. In one embodiment, the EVM is provided in a pair of registers of the register set 537. The pair of registers is used for the numerator and denominator, respectively, of the determined EVM measure.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 500 is compatible with one or more variants of the IEEE-802.11 standards for wireless local area network (WLAN) applications. The RF transceiver 505 and modem 507 constitute a complete wireless engine for layer-1 physical layer (PHY) functionality for one or more of the IEEE-802.11 PHY variants, and the MAC 514 is IEEE-802.11-compatible.

One embodiment of the system 500 preferably is constructed on a single printed circuit board (PCB). The RF transceiver 505 and modem 507 are each implemented with CMOS technology in individual integrated circuits (chips).

According to one aspect of the invention, each STA such as STA 500 maintains a database of the beacons and probe responses it receives. Beacons and probe responses are stored in the database under one or more circumstances, e.g., when the STA determines whether or not to associate with an AP. We call this database the Beacon Table. As shown in FIG. 5, in one embodiment, the Beacon Table 531 is in the memory 516 of the STA. Other embodiments store the Beacon Table 531 outside of memory 516. A STA stores the information from the beacons and probe responses in its Beacon Table 531, and further stores additional information about the state of the STA when it receives the beacon.

Another embodiment described below stores, in addition to information from beacons and probe responses, information on any packets from remote stations, even those directed to other, third-party stations is recorded. See below for the case that the station is EVM-capable and maintains information, including the EVM of received packets from any station it can hear.

When acting as a client station, in the version shown in FIG. 5, the Beacon Table 531 in memory 516 of station 500 provides a list of APs with which the station can associate.

Furthermore, in some embodiments, the memory 516 includes code segments to cause the host processor and/or other programmable elements in the station 500 to carry out the inventive methods described herein, e.g., the flowchart of FIG. 3 in the case of the station 500 is a client station in association with an AP, and the flowchart of FIG. 2 in the case the station 500 is an AP that is about to go offline.

Note that in a managed wireless network, some aspects of the invention may be managed by the WLAN manager, rather than by an AP. Thus, the wireless manager sends information to one or more APs that the APs are to be taken offline. The APs in turn carry out the method described, e.g., in FIG. 2.

It should be appreciated that although the invention has been described in the context of the IEEE 802.11 standard, the invention is not limited to such contexts and may be utilized in various other applications and systems.

While an embodiment has been described for operation in a wireless station with RF frequencies in the 5 GHz range and 2.4 GHz range, e.g., the 802.11a and 802.11g variants of the IEEE 802.11 standard, the invention may be embodied in receivers and transceivers operating in other RF frequency ranges. Furthermore, while a embodiment for operation conforming to the IEEE 802.11 standard has been described, the invention may be embodied in wireless stations conforming to other standards and for other applications, including, for example other WLAN standards and other wireless standards.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one or more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a wireless station acting as an AP, or a wireless station acting as a client station. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

"Variants of the IEEE 802.11 standard" as used herein means the variants and proposed variants of the IEEE 802.11 standard. Variants are versions defined in clauses of the standard and proposed amendments of the standard.

While one embodiment of a wireless station (FIG. 5) is for half-duplex operation, and includes a transmit/receive switch 504, other embodiments are for full duplex operation.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first access point of a wireless network, the first access point in communication with a set of at least one associated client station, the method comprising:
    reducing the transmit power of wireless communication used to wirelessly transmit information to each client station of the set; and
    wirelessly transmitting a management frame, the management frame containing data that explicitly indicates that the first access point will be going offline, the data that explicitly indicates including information indicative of time,
    such that each associated client station of the set can eventually wirelessly roam to a second access point as a result of the received signal strength or signal quality at the client falling below a pre-defined threshold prior to the first access point going offline, and
    such that a particular client station receiving the management frame and interpreting the data, if associated with the first access point can eventually wirelessly roam to another access point, and if not associated with the first access point, can avoid associating with the first access point.

2. A method as recited in claim 1, wherein the wireless network substantially conforms to the IEEE 802.11 standard or a derivative thereof.

3. A method as recited in claim 1, wherein the reducing of the transmit power includes reducing the transmit power in a plurality of steps until a pre-defined minimum transmit power level is reached.

4. A method as recited in claim 3, wherein each step of lowering of power is separated by at least 1 second.

5. A method as recited in claim 1, wherein the first access point goes offline in a pre-defined amount of time.

6. A method as recited in claim 5, wherein the pre-defined amount of time is 10 seconds.

7. A method in a first access point of a wireless network, the first access point in communication with a set of at least one associated client station, the method comprising:
    reducing the transmit power of wireless communication used to wireless transmit information to each client station of the set; and
    wirelessly broadcasting a management frame, the management frame containing data that explicitly indicates that the first access point will be going offline, the data that explicitly indicates including information indicative of time,
    such that each associated client station of the set can eventually wirelessly roam to a second access point as a result of the received signal at the client station falling below a pre-defined threshold prior to the first access point going offline, and
    such that each associated client station of the set that receives the management frame can wirelessly roam to a second access point prior to the first access point going offline, and such that a wireless station receiving the management frame, if not associated with the first access point, can avoid associating with the first access point.

8. A method as recited in claim 7, wherein the wireless network substantially conforms to the IEEE 802.11 standard or a derivative thereof.

9. A method as recited in claim 8, wherein the management frame substantially conforms to a standard beacon frame, with at least one additional information element.

10. A method as recited in claim 7, wherein the reducing of the transmit power includes reducing the transmit power in a plurality of steps until a pre-defined minimum transmit power level is reached.

11. A method as recited in claim 10, wherein the first access point goes offline in a pre-defined amount of time.

12. A method as recited in claim 11, wherein the pre-defined amount of time is 10 seconds.

13. A method as recited in claim 7, wherein wirelessly broadcasting the management frame includes wirelessly broadcasting the management frame a plurality of times.

14. A method as recited in claim 13, wherein the power level used in each of the plurality of times of wirelessly broadcasting the management frame is greater than a minimum power level.

15. A method as recited in claim 13, wherein each step of wirelessly broadcasting the management frame is separated by a pre-defined time interval.

16. A method as recited in claim 7, wherein the wirelessly broadcasting of the management frame occurs after the lowering of power.

17. An apparatus in a first access point of a wireless network, the first access point in communication with a set of at least one associated client station, the apparatus comprising:
    means for reducing the transmit power of wireless communication used to wirelessly transmit information to each client station of the set-and means for wirelessly transmitting a management frame, the management frame containing data that explicitly indicates that the first access point will be going offline, the data that explicitly indicates including information indicative of time,
such that each associated client station of the set can eventually wirelessly roam to a second access point as a result of the received signal at the client falling below a pre-defined threshold prior to the first access point going offline, and
such that a particular client station receiving the management frame and interpreting the data, if associated with the first access point can eventually wirelessly roam to another access point, and if not associated with the first access point, can avoid associating with the first access point.

18. An apparatus as recited in claim 17, wherein the data that explicitly indicates includes an indication of time.

19. An apparatus as recited in claim 17, wherein the reducing by the means for reducing includes reducing the transmit power in a plurality of steps until a pre-defined non-zero minimum transmit power level is reached.

20. An apparatus in a first access point of a wireless network, the first access point in communication with a set of at least one associated client station, the apparatus comprising:
  means for reducing the transmit power of wireless communication used to wireless transmit information to each client station of the set; and
  means for wirelessly broadcasting a management frame, the management frame containing data that explicitly indicates that the first access point will be going offline, the data that explicitly indicates including information indicative of time,
  such that each associated client station of the set can eventually wirelessly roam to a second access point as a result of the received signal at the client station falling below a pre-defined threshold prior to the first access point going offline, and
  such that each associated client station of the set that receives the management frame can wirelessly roam to a second access point prior to the first access point going offline, and such that a client station not associated with the first access point can avoid associating with the first access point.

21. A tangible computer-readable medium encoding machine-readable and machine-executable instructions that when executed by one or more processors of a processing system in a first access point of a wireless network cause the access point to carry out a method, the first access point in communication with a set of at least one associated client station, the method comprising:
  reducing the transmit power of wireless communication used to wirelessly transmit information to each client station of the set-and
  wirelessly transmitting a management frame, the management frame containing data that explicitly indicates that the first access point will be going offline, the data that explicitly indicates including information indicative of time,
  such that each associated client station of the set can eventually wirelessly roam to a second access point as a result of the received signal at the client falling below a pre-defined threshold prior to the first access point going offline, and
  such that a particular client station receiving the management frame and interpreting the data, if associated with the first access point can eventually wirelessly roam to another access point, and if not associated with the first access point, can avoid associating with the first access point.

22. A tangible computer-readable medium as recited in claim 21, wherein the first access point goes offline in a pre-defined amount of time.

23. A tangible computer-readable medium as recited in claim 21, wherein the wireless network substantially conforms to the IEEE 802.11 standard or a derivative thereof.

24. A tangible computer-readable medium as recited in claim 21, wherein the reducing of the transmit power includes reducing the transmit power in a plurality of steps until a pre-defined minimum transmit power level is reached.

25. A tangible computer-readable medium with machine-readable and machine-executable code segments coded thereon that when executed cause one or more processors of a processing system in a first access point of a wireless network to execute a method, the first access point in communication with a set of at least one associated client station, the method comprising:
  reducing the transmit power of wireless communication used to wirelessly transmit information to each client station of the set; and
  wirelessly broadcasting a management frame, the management frame containing data that explicitly indicates that the first access point will be going offline, the data that explicitly indicates including information indicative of time,
  such that each associated client station of the set can eventually wirelessly roam to a second access point as a result of the received signal at the client falling below a pre-defined threshold prior to the first access point ceasing being active going offline, and
  such that each associated client station of the set that receives the management flame can wirelessly roam to a second access point prior to the first access point going offline, and such that a wireless station not associated with the first access point can avoid associating with the first access point.

26. A tangible medium as recited in claim 25 wherein the reducing the transmit power includes monotonically reducing the power in a plurality of steps until a pre-defined minimum transmit power level is reached.

27. A tangible computer-readable medium as recited in claim 25, wherein the wireless network substantially conforms to the IEEE 802.11 standard or a derivative thereof.

28. A tangible computer-readable medium as recited in claim 27, wherein the management frame substantially conforms to a standard beacon frame, with at least one additional information element.

* * * * *

UNITED STATES PATENT AND TRADEMARK OFFICE
CERTIFICATE OF CORRECTION

PATENT NO. : 7,647,046 B2 Page 1 of 1
APPLICATION NO. : 11/034912
DATED : January 12, 2010
INVENTOR(S) : Huang et al.

It is certified that error appears in the above-identified patent and that said Letters Patent is hereby corrected as shown below:

In Column 8, line 55, kindly change "EEE 802.11" to --IEEE 802.11--

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,647,046 B2
APPLICATION NO. : 11/034912
DATED : January 12, 2010
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-eighth Day of December, 2010

David J. Kappos
*Director of the United States Patent and Trademark Office*